United States Patent [19]

Seidel

[11] 4,048,453

[45] Sept. 13, 1977

[54] TELEPHONE HANDSET SUPPORT DEVICE

[76] Inventor: Gustave Seidel, 333 Passaic St., Hackensack, N.J. 07601

[21] Appl. No.: 656,999

[22] Filed: Feb. 11, 1976

[51] Int. Cl.² .................................................. H04M 1/05
[52] U.S. Cl. ................................................... 179/156 R
[58] Field of Search ..................................... 179/156 R

[56] References Cited
U.S. PATENT DOCUMENTS

| 2,020,084 | 11/1935 | Sidders | 179/156 R |
| 2,481,387 | 9/1949 | Bonecutter | 179/156 R |
| 3,225,147 | 12/1965 | Dollinger | 179/156 R |
| 3,787,899 | 1/1974 | Krawagna | 79/156 R |

Primary Examiner—William C. Cooper
Attorney, Agent, or Firm—Sheldon H. Parker

[57] ABSTRACT

The telephone handset supporting assembly employs a standard telephone headband which goes over the user's head in a fashion as to be secure, yet comfortable. The headband can be molded as a one piece plastic element. On one side of the headband is a simple interlocking device by which a second part of the assembly can be coupled to the headband. The second part of the assembly is secured to the telephone earpiece and is a lightweight, durable, one piece molded plastic component. The earpiece attachment member is attached to the telephone by unscrewing the telephone earpiece and inserting the earpiece section between the handle portion of the telephone handset and the removeable earpiece. The plastic earpiece attachment member is made of a dimension which will in no way interfere with or damage the telephone, or in any way interact with or interfere with any electronic components of the telephone.

8 Claims, 12 Drawing Figures

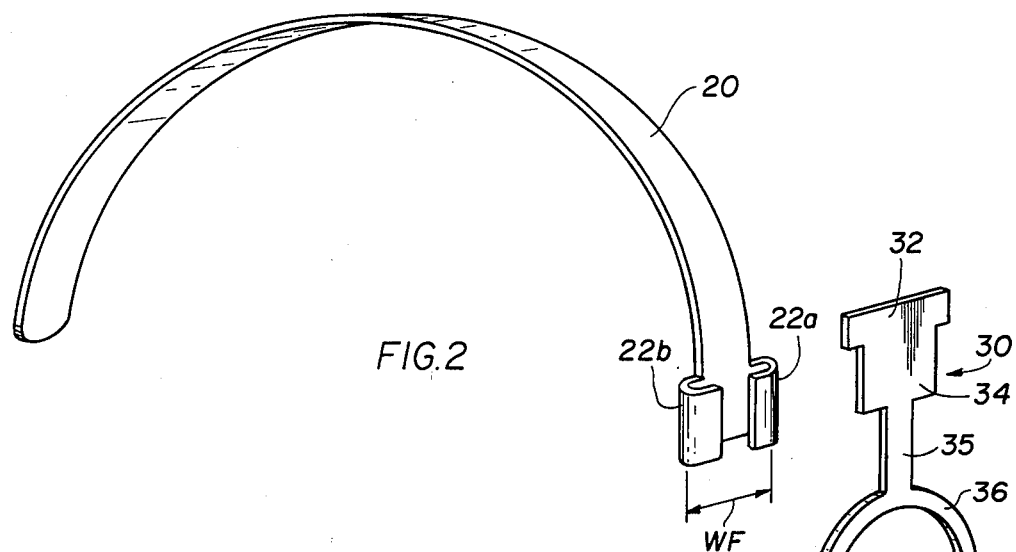
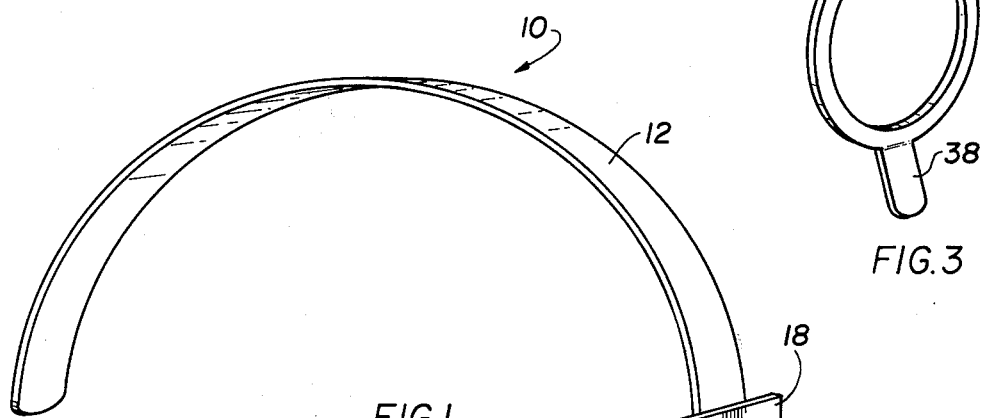
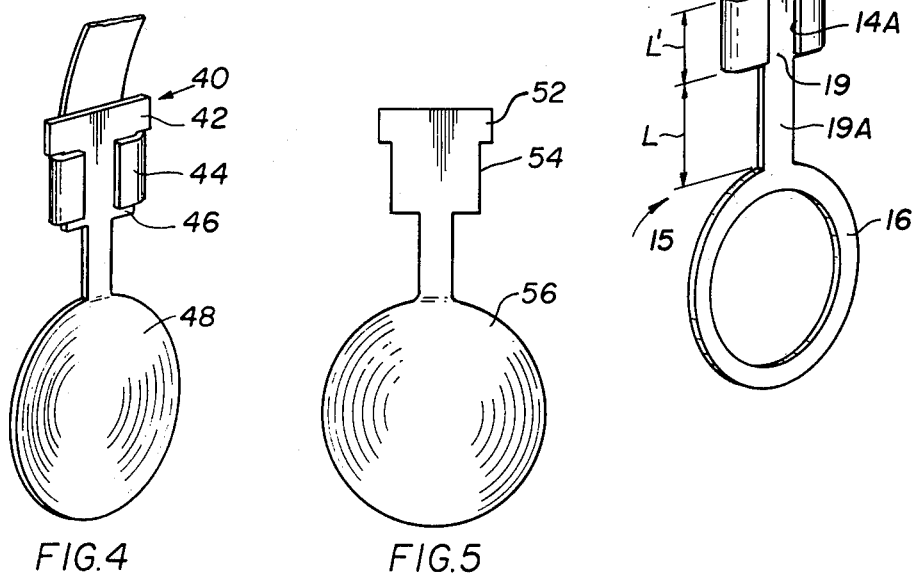

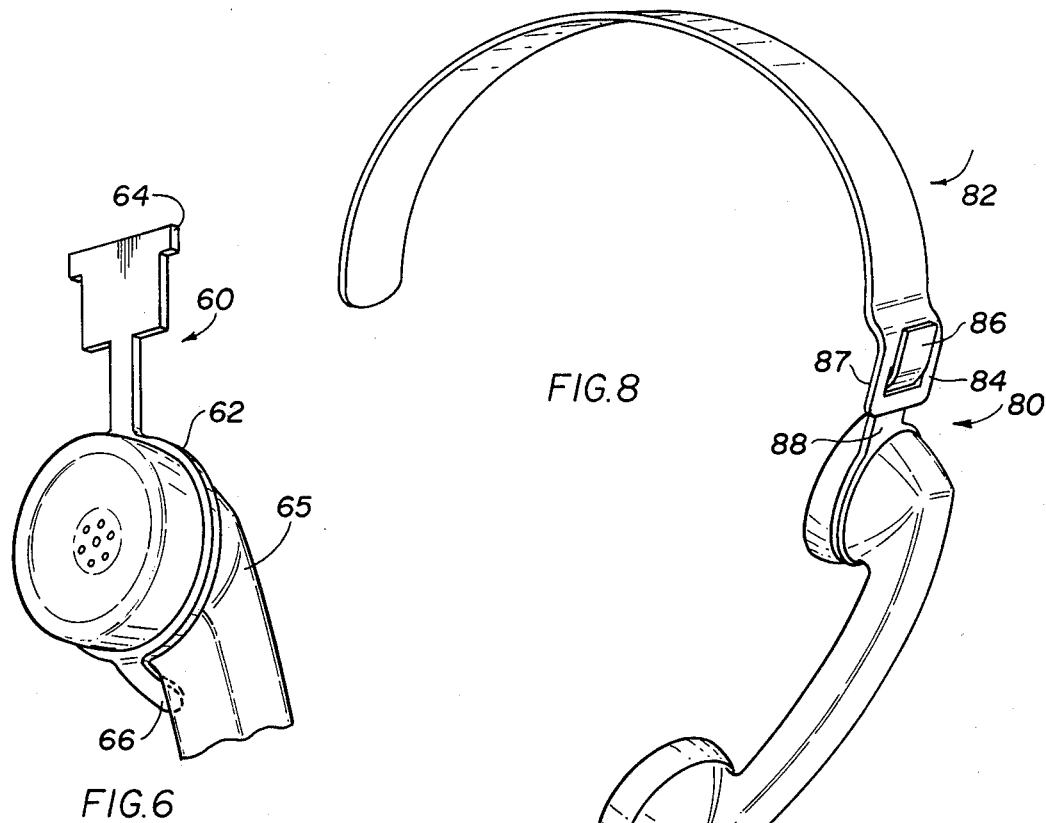
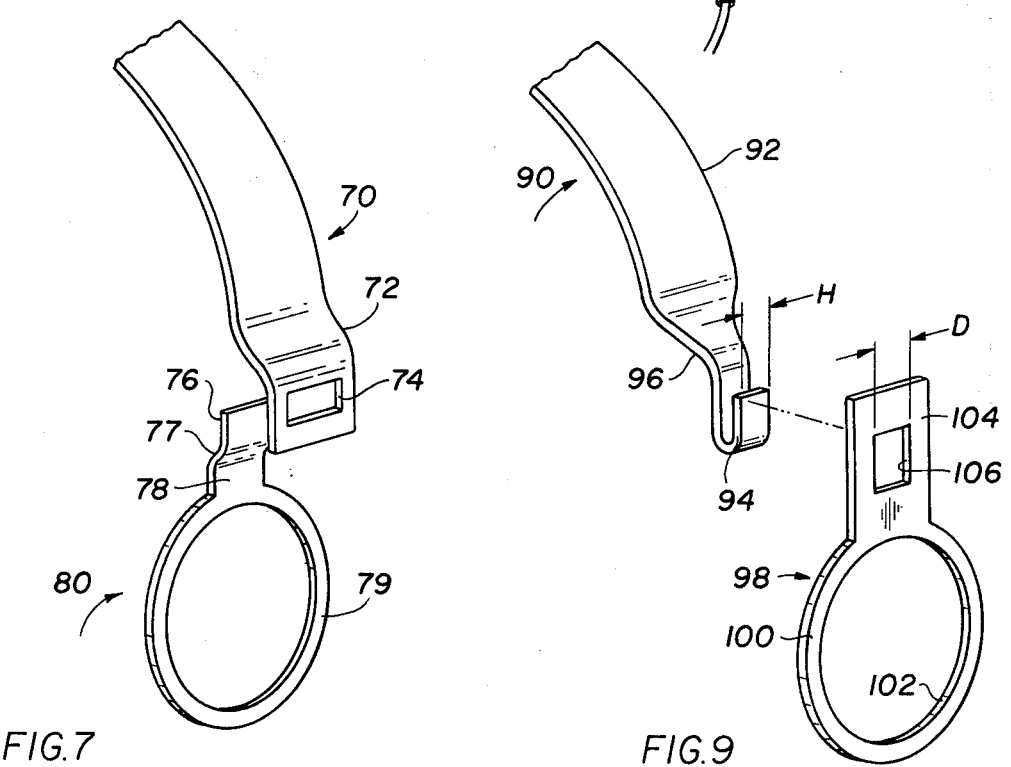

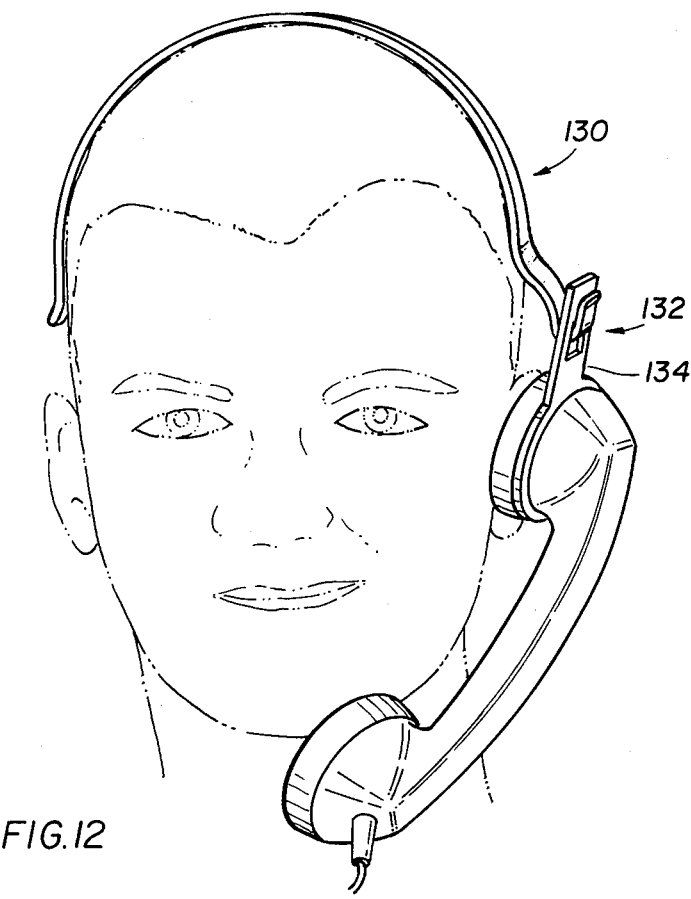
FIG.12
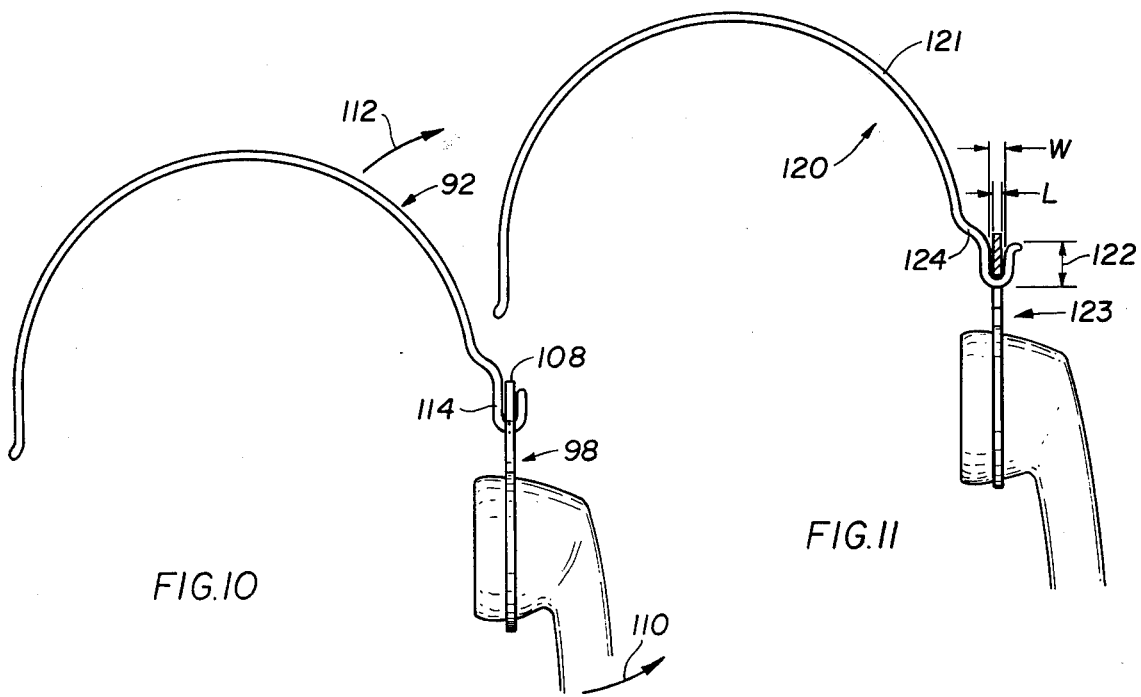
FIG.10
FIG.11

TELEPHONE HANDSET SUPPORT DEVICE

BACKGROUND OF THE INVENTION

1. Field of the Invention

The instant invention relates to improvements on a telephone headset which enables the user to comfortably maintain a telephone in a talking position, while allowing the hands to be free for other activities.

2. Brief Description of the Prior Art

Numerous patents have ben issued which relate to a device for enabling the user to comfortably maintain the telephone in a talking position while allowing the hands to be free for other activities. Nevertheless, devices similar to that of the instant invention have not achieved commercial success.

U.S. Pat. No. 2,481,387 (1949) provides a headset gear with a circular brace hooking onto the telephone earpiece thereby holding the telephone in a position applicable for talking. The disadvantage of this device however, is that the connection between the circular brace holding the telephone receiver and the headband which extends over the user's head is connected by a pivot device. The pivot device would be expected to work effectively with a metal apparatus, however, the use of metal would contribute to the weight of the headset and would be expected to render the device uncomfortable to use. If made from lightweight plastic, the system would appear to be difficult to install without breaking the plastic or preventing breakage during use. An additional drawback of the holder is noted in regard to the curved headband pivotly attached to the holder and adapted to be moved aside by hand. The headband is adapted to pivot outwardly so that it may be readily supported upon the head of the user with the ear portion of the telephone receiver directly overlying the user's ear. However, when the headband is swung back over the telephone receiver handset, it provides for unattractive and awkward storage. In the event of home use, there may not be room on a wall telephone for the storage of the headband and in office use it would give an excessively unattractive appearance to the telephone. It would also be excessively easy to knock the telephone off the telephone body, therefore raising the possibility of putting the telephone out of use.

U.S. Pat. No. 2,721,234 (1955) is another headset device similar to that previously described in U.S. Pat. No. 2,481,387, except that it adds to the standard headband type apparatus, a complicated telephone locking device at one end which locks onto the ring attached to the earpiece of the telephone. The locking device consists of numerous parts and would be complicated and expensive to manufacture. In addition, the headset must remain on the telephone, therefore causing an awkward storage problem. If the headset is removed it would appear to take considerable time to reestablish the position necessary for comfortable use and thus would not be a quick, convenient to use telephone headband apparatus.

U.S. Pat. No. 3,225,147 (1965) is similar to the embodiment of the previously discussed patent. Once again there is a headset which goes over the user's head and an attachment that attaches itself to the earpiece of the telephone. In the patent, there is provided a device which swings the headband back along side the telephone receiver hand piece and which allows for more convenient storage than the previously discussed patents. Again, however, the attachment system of the patent is a complicated one requiring the use of metal parts. The telephone receiver can be removed from the headband, however, the connection pieces are in a nut and bolt type apparatus and would involve time consuming, repeated removal in addition to a potential loss of parts.

SUMMARY OF THE INVENTION

In the instant invention the foregoing complications are overcome and a simple, convenient, easy to manufacture telephone headset head support device is produced. The head support device includes a headband member contoured to conform to the user's head, and a handset attachment member. The headband and the handset attachment member have cooperating interlocking components which releaseably interconnect the two members. The interlocking components can be a hook device on one member and a hook receiving opening in the other member.

A BRIEF DESCRIPTION OF THE DRAWINGS

In the drawings:

FIG. 1 is a perspective view of an embodiment of the invention;

FIG. 2 is a perspective view of a headband member;

FIG. 3 is a perspective view of a telephone attachment member;

FIG. 4 is a fragmentary perspective view of another embodiment of a headset;

FIG. 5 is a side view of the optional earpiece cup for use with the embodiment of FIG. 4;

FIG. 6 is a side view of the telephone set with the attachment device installed;

FIG. 7 is a perspective view of an alternate embodiment of the invention;

FIG. 8 is a perspective view of the modification of FIG. 7, in combination with a telephone headset;

FIG. 9 is a perspective view of a further embodiment of the invention;

FIG. 10 is a side view of the embodiment of FIG. 9;

FIG. 11 is a side view of a still further embodiment of the invention; and,

FIG. 12 is a perspective view of the modification of FIG. 11, shown in use.

DETAILED DESCRIPTION

The instant invention overcomes the difficulties of the prior U.S. Pat. Nos. 3,225,147 and 2,721,234 through the use of a construction which is of a simple two piece molded type assembly. Each part can be manufactured using simple, well known, molding operations. The production costs would be extremely low thus rendering the device suitable to mass market sales. The device eliminates the need for pivotal arrangements and is not prone to breakage either in manufacture or in use.

In the embodiment, as illustrated in FIG. 1, a headset 10 is shown with the slip body 19 inserted into the flange 14 as would be the case when the headset is fully set up. The supportive headband 12 is preferably formed of plastic, however, other materials can be used provided they are lightweight and inexpensive. The supportive headband 12 is placed over the head of the user in a comfortable position. The flange 14 portion is situated at one end of the supportive headband 12 and is molded as a unitary part of the supportive headband 12. This one piece molding operation is a primary advantage of the instant invention in that it allows for low cost and rapid, automatic manufacture.

The second component part of the invention, as shown in FIG. 1, is the handset attachment member 15. The slip shoulder 18 of the handset attachment member 15 is as wide or wider than the flange 14 members. Extending downward from the slip shoulder 18 is the slip body 19, the upper portion which is molded in a size to fit snugly between the flange 14; a friction fit being preferable. The bottom section 19A of the slip body 19 is molded in a size small enough to fit between the outer portion of the edges 14A of flange 14.

The length L of the bottom section must be long enough to permit the bottom section 19A to fit between the flange edges 14A, and thus must be somewhat longer than the distance L. The collar 16 extends downward from the lower portion of the slip body 19. The interior portion of the collar 16 is molded in a size to fit the inner section, of the handset of a telephone when the outer unscrewable section of the earpiece is removed. The outer dimension of the collar 16 is molded in a size to be flush or near flush to the outer portion of the telephone earpiece. The thickness of the collar 16 must be of a small enough size as to allow the earpiece to be re-screwed securely to the telephone handset.

The supportive headset 20 of FIG. 2 is shown separated from the handset attachment member 30 and shows the individual pieces. The supportive headband 20 is shown with its curvature which fits over the head of the user. For consumer appeal the supportive headset 20 can be manufactured in various sizes to facilitate comfortable fittings. The flanges 22a and 22b are clearly shown extended outward a short distance from either side of one end of the supportive headband 20. The flanges 22a and 22b form a semicircle, which curves a sufficient amount to hold the upper portion of the slip body 34 in place. The curvature of the flanges 22a and 22b must not be curved to the extent in which to inhibit the fit of the lower portion of slip body 34 to fit therebetween. The flanges 22a and 22b are not restricted to the curvature formation as shown in the instant drawings but rather can take various shapes. The supportive headband 20 is shown as being a one piece molded part, preferably of lightweight, durable plastic. The slip shoulder 32 of the handset attachment member 30 is shown extending outward from the slip body 34.

In the preferred embodiment of the slip shoulder 32 the width is equal to that of the distance between the outer edges of the flanges 22a and 22b. This does not, however, put a restriction on the length, except that the slip shoulder 32 must not be narrower than the interior distance between the flanges 22a and 22b. The overlap of the slip shoulder 32 on to the top edges of the flanges 22a and 22b is important in that it prevents the headset attachment member 30 from slipping down through the flanges 22a and 22b. The upper portion of the slip body 34 extends downward from the slip shoulder 32. Although the thickness of the slip body 34 is equal to that of the slip shoulder, which in turn must be same or slightly greater than the distance between the interior of the outer sections of the flanges 22a and 22b and the supportive headband 20, to provide a friction fit. The width "W" of the upper portion of the slip body 34 should be the same or slightly less than the width "W-F" between the interior of flanges 22a and 22b. The width "W" can be dimensioned with respect to width "W-F" so as to provide a friction fit between the flanges 22a and 22b. The lower portion 35 of the slip body 34 extends downward from the upper portion of the slip body 34. The thickness of the lower portion and the upper portion are the same, however, the lower portion 35 of the slip body 34 is narrower than that of the upper portion of the slip body 34. The sides of the lower portion 35 form right angles with the bottom edge of the upper portion of the slip body 34. The width of the lower portion of the slip body 34 must be narrower than the distance between the outer curvature of the flanges 22a and 22b in order to facilitate the insertion of the headset attachment member 30 between the flanges 22a and 22b.

Extending downward from said lower portion of the slip body 34 is the collar 36. The collar 36 employs the dimensions as heretofore described in respect to FIG. 1. FIG. 3 shows an additional embodiment of the invention, wherein a lug 38 is incorporated. The lug 38 extends downward from the bottom section of the collar 36 and curves outwardly in the opposite direction from that of the supportive headband 20. The lug 38 serves to further support the telephone in a manner as to position the mouthpiece close to the mouth of the user.

FIG. 4 shows an additional embodiment of th instant invention. The headset 40 is shown the same as described in FIG. 2 with the addition of a second flange 43 and 43b and identical to the first flange 42a and 42b. The second flange 43a and 43b is positioned directly opposite the first flange 42a and 42b at the end of the supportive headband 42. The flange 43a and 43b supports the ear cup attachment member 50 as shown in FIG. 5. The attachment section, the slip shoulder 52 and slip body 54 are the same as described in FIG. 3, however instead of the collar 36 an ear cup 56 is used. The ear cup 56 can be a simple curved plastic cup and an extension of the one cast mold. The invention is not however limited to this and any type of conventional ear cup may be used.

FIG. 6 shows a side view of the headset attachment member 60 as it would be seen attached to a telephone handset 65 ready for use.

FIG. 7 shows an additional embodiment of the instant invention. Headset 70 is shown, as per the previous embodiments, with an additional system for the attachment of the headset attachment member 80. An interlock slot 74 is provided in one end of the supportive headband 72, the interlock slot 74 being narrower in width than that of the supportive headband 72. The headset attachment member 80 is provided, at the top end, with an interlock tongue 76 which is slightly smaller in width than the interlock slot 74, forming a snug fit, preferably a friction fit. Directly below the interlock tongue 76 is the interlock brace 77 which extends outward at a right angle to the interlock tongue 76 in the opposite direction of the supportive headband 72. The interlock brace 77 must have a length at least equal to the width of the supportive headband 72. Extending downward from the interlock brace 77, at a right angle thereto, and parallel to the interlock tongue 76, is the interlock body 78. The collar 79 is positioned as in the previous embodiments.

FIG. 8 shows the headset attachment member 80 in an interlock position with the supportive headband 82. The interlock tongue 86 is inserted into the interlock slot 84, preventing the headset attachment member 80 from tilting in a directon away from the user's mouth. The interlock brace 87 rests on the interlock slot 84, preventing slippage downward. The interlock body 88 rests on the inside of the supportive headband 82, also preventing the headset attachment member 80 from tilting away from the user's face. The rectangular shape of the interlock pieces prevents any side-to-side slippage of the telephone.

A further modification shown in FIG. 9 wherein the headset 90 is seen to include a supportive headband 92 having a hooked portion 94 at one end. An "s" or "Z" shaped section 96 located between the headband 92 and the hooked portion 94 permits the lower end of the supportive headband 92 to be spaced away from the head of the user and thus permit proper relationship between the telephone handset and the ear of the user. A telephone attachment member 98 includes a collar section 100 having a telephone receiving opening 102. An elongated portion 104 includes an opening 106. The dimension D of the opening 106 must be at least equal to the dimension H of the hooked member so as to permit the hooked member to pass through the opening. In use as is shown in FIG. 10, the opening 106 of the telephone attachment member 98 is slipped over the hooked portion 94 of the supportive headband 92, either manually, or due to the weight of the telephone, the telephone attachment member 98 will ride downward with respect to the supportive headband 92 so that the hooked member 94 engages in the upper section 108 of the telephone attachment member 98. It is thus seen that the telephone attachment member 98 and supportive headband 92 can lock together. In use, the telephone attachment member will tend to rotate in the direction of arrow 110, while the supportive headband will tend to rotate in the direction illustrated by arrow 112. Reliance must be made upon the hook and opening assembly to prevent this rotation. It is thus seen that the engagement between the upper end 108 of the telephone attachment member and the lower section 114 of the supportive headband will prevent the aforesaid rotation in cooperation with the action of the hooked member 94.

The modification of FIGS. 9 and 10 is noted to be of extreme value from a manufacturing standpoint in that extremely simple molding configurations are obtained. It should be readily apparent that telephone attachment member 98 can be made using a conventional two piece mold since the member is totally free of undercut or any other configurations which interfere with molding operations. Supportive headband member 92 similarly can be made in a conventional two piece mold thus permitting extremely low cost manufacture. This modification is for these reasons, preferred once the prior modifications for manufacture reasons.

The modification as shown in FIG. 11 is like that shown in FIGS. 9 and 10 with the exception of the hooked member 122. The hooked member 122 is formed with a lip curving outwardly from the headset member 121. The width I of the hooked member 122 must be slightly less than the width J of the telephone attachment member 123. The telephone attachment member 123 is formed as outlined in FIGS. 9 and 10. The telephone attachment member 123 is attached to the headset 121 by slipping the hooked member 122 through the provided opening, as illustrated in FIG. 9, the telephone attachment member being in a position in which the upper portion is parallel with the s or z shaped section 124. The telephone attachment member 123 is then snapped downward resting in the position ready for use, as described in the prior embodiments. The telephone attachment member is held in place by the pressure exerted on it by the differences in width between I and J.

This embodiment again provides for easy manufacturing with the two piece mold system.

FIG. 12 shows the telephone headset 130 in use. For clarity, FIG. 12 is shown in a combination of two planes. The headset 130 is shown as a front view, while the telephone attachment member 132 and telephone 134 is shown on a plane with a 45° angle to that of the headset 130.

What is claimed is:

1. Telephone handset supporting device comprising a semi-circular headband member and an essentially planar telephone headset attachment member, said headband member being ribbon-like and having interlocking attachment means for detachably receiving a cooperating interlocking member on said telephone attachment member and wherein a flat surface of said headband member cooperates with a flat surface of said attachment member to preclude relative rotation.

2. The apparatus of claim 1 wherein said telephone handset attachment member has an opening adjacent one end and said headband member has an elongated tongue end dimensioned such that it can be passed through said opening and having a substantially hooked configuration, the other end of said telephone attachment member having a circular opening dimensioned such that it can be attached to a telephone handset.

3. The structure of claim 2, wherein said circular opening is dimensioned such that it receives and overlies a male threaded portion of a telephone handset and is locked in place by the cooperating female threaded portion of said telephone handset.

4. The apparatus of claim 1, wherein said headband member has a pair of spaced flange members which form a "C" shaped configuration and said telephone attachment member has a first section which is narrow enough to be passed through the space between the opposing ends of said "C" shaped configuration said first section being adjacent said end having said telephone receiving opening, a second section adjacent said first section, said second section being approximately equal to the dimension between the furthest spaced apart points of said "C" shaped configuration and an upper shoulder section having a dimension greater than the space between said "C" shaped member so as to prevent the telephone attachment member from passing between the opposing ends of said "C" shaped configuration.

5. The apparatus of claim 1, comprising said telephone attachment section having a telephone receiving opening, a first body section having a dimension less than the closest space between the opposing flange members, an upper section comprising a slip body having a dimension approximately equal to the furthest space between said flange members dimensioned to form a slip fit with said flange members, an adjacent said slip body portion a slip shoulder having a dimension greater than the widest space between said flange members in order to prevent movement of said telephone attachment member through said flange body.

6. The apparatus of claim 5, wherein said telephone attachment member includes an extension member engaging a telephone handset and preventing rotation of said telephone handset when interlocked with said telephone attachment member.

7. The telephone head supporting device of claim 1, further comprising said handset attachment member having a region having a hooked end, said telephone headband member having an elongated portion having a non-circular opening therein for receiving said hooked end of said attachment member and being dimensioned such that when said hooked member is passed through said opening the weight of the telephone will cause the telephone attachment member to ride downwardly thereby preventing rotation of said telephone attachment member with respect to headband member when said headband member is engaged on a user's head and the telephone attachment member is supporting the telephone handset.

8. The structure of claim 1, wherein said headband member attachment means includes a flat hook-like means and said telephone attachment member has an elongated opening for receiving said flat hook-like means.

* * * * *